(12) United States Patent
Urushidani

(10) Patent No.: US 9,404,803 B2
(45) Date of Patent: *Aug. 2, 2016

(54) LIGHT MEASUREMENT DEVICE WITH IDENTIFIABLE DETECTION ELEMENTS

(71) Applicant: Seiko Epson Corporation, Tokyo (JP)

(72) Inventor: Tatsuo Urushidani, Chino (JP)

(73) Assignee: Seiko Epson Corporation (JP)

( * ) Notice: Subject to any disclaimer, the term of this patent is extended or adjusted under 35 U.S.C. 154(b) by 25 days.

This patent is subject to a terminal disclaimer.

(21) Appl. No.: 14/484,434

(22) Filed: Sep. 12, 2014

(65) Prior Publication Data

US 2014/0375996 A1 Dec. 25, 2014

Related U.S. Application Data

(62) Division of application No. 13/247,089, filed on Sep. 28, 2011, now Pat. No. 8,860,950.

(30) Foreign Application Priority Data

Oct. 28, 2010 (JP) .................................. 2010-241839

(51) Int. Cl.
| | |
|---|---|
| G01J 3/26 | (2006.01) |
| G01J 3/51 | (2006.01) |
| G01J 3/02 | (2006.01) |
| G01J 3/28 | (2006.01) |
| G02B 26/00 | (2006.01) |
| G01J 3/12 | (2006.01) |

(52) U.S. Cl.
CPC .. *G01J 3/51* (2013.01); *G01J 3/027* (2013.01); *G01J 3/12* (2013.01); *G01J 3/26* (2013.01); *G01J 3/28* (2013.01); *G02B 26/001* (2013.01); *G01J 2003/1247* (2013.01)

(58) Field of Classification Search
CPC ............. G01J 3/26; G01J 3/02; G01J 9/0246; G01J 3/28; G01J 3/027; G01J 3/12; G01J 3/51; G01J 2003/1247; G02B 26/001; G02B 6/29359; G02B 6/29358; G02B 26/002; G02B 26/007
USPC ................. 359/260, 359, 585, 589, 578, 579; 356/454, 519
See application file for complete search history.

(56) References Cited

U.S. PATENT DOCUMENTS

| | | | |
|---|---|---|---|
| 5,550,373 A | 8/1996 | Cole et al. | |
| 2006/0139780 A1 | 6/2006 | Matsumoto | |
| 2007/0046950 A1* | 3/2007 | Brown ................. | G02B 26/001 356/506 |
| 2007/0086018 A1* | 4/2007 | Shih ................... | G01B 9/02044 356/498 |
| 2008/0080027 A1* | 4/2008 | Mestha ..................... | G01J 3/02 358/504 |
| 2012/0206813 A1 | 8/2012 | Bahat et al. | |

FOREIGN PATENT DOCUMENTS

| | | |
|---|---|---|
| JP | 11-142752 | 5/1999 |
| JP | 2002-062491 A | 2/2002 |
| JP | 2006-178320 A | 7/2006 |
| JP | 2009-244498 A | 10/2009 |
| JP | 2009-251105 A | 10/2009 |

* cited by examiner

*Primary Examiner* — Michael P Lapage
(74) *Attorney, Agent, or Firm* — Harness, Dickey & Pierce, P.L.C.

(57) ABSTRACT

A light measurement device comprising an optical sensor that includes a tunable interference filter and a detecting section detecting light passed through the tunable filter, a storing section that stores a first correlation data and a second correlation data, and a CPU that obtains amount of the light by controlling the optical sensor based on the first correlation data and a second correlation data.

7 Claims, 8 Drawing Sheets

LIGHT MEASUREMENT DEVICE WITH IDENTIFIABLE DETECTION ELEMENTS

CROSS-REFERENCE TO RELATED APPLICATIONS

This is a divisional patent application of U.S. application Ser. No. 13/247,089 filed Sep. 28, 2011 which claims priority to Japanese Patent Application No. 2010-241839 filed Oct. 28, 2010 all of which are incorporated by reference herein in their entireties.

BACKGROUND

1. Technical Field

The present invention relates to a light measurement device provided with a tunable interference filter that extracts, from an incident light, a light with a predetermined wavelength.

2. Related Art

In the past, an interference filter that makes a pair of reflection coatings face each other and transmits or reflects a light of an incident light, the light with a predetermined wavelength which was intensified by multiple interference by the pair of reflection coatings, has been known (see, for example, JP-A-2009-251105 (Patent Document 1)).

In an optical filter apparatus described in Patent Document 1, a pair of substrates are made to face each other, and one of the substrates is provided with a movable section (a first portion) and a diaphragm (a second portion) that holds the movable section in such a way that the movable section can move with respect to the other substrate. On the movable section, one of a pair of reflection coatings (mirrors) is formed, and, on the other substrate, the other reflection coating facing the reflection coating formed on the movable section is formed. In such an optical filter apparatus, a gap dimension between the pair of reflection coatings can be changed by moving the movable section, whereby it is possible to extract a light according to the gap dimension.

Incidentally, in Patent Document 1, when the gap between the reflection coatings is changed, the movable section held by the diaphragm is bent toward the other substrate by electrostatic attraction. In this case, the movable section is moved toward the other substrate by bending of the diaphragm, and, at this time, the movable section also bends slightly, which makes the mirror provided on the movable section also bend. This makes it impossible to make the gap dimension between the pair of reflection coatings uniform and allows lights with different wavelengths to pass depending on the position in the reflection coating, causing a reduction in resolution. In this case, when an imaging sensor formed of a plurality of imaging devices is provided so as to face the interference filter, the wavelengths of the lights which enter the imaging devices differ from one another, making it impossible to grasp accurately the amount of light with a wavelength to be detected.

SUMMARY

An advantage of some aspects of the invention is to provide a light measurement device that can accurately measure the amount of light with a wavelength to be measured.

A light measurement device according to an aspect of the invention includes: a tunable interference filter that transmits a light of an incident light, the light intensified by multiple interference; a detecting section that detects the light which has passed through the tunable interference filter; and a control section that measures the intensity of a light with a measurement wavelength, which is an object to be measured, by controlling the tunable interference filter, wherein the tunable interference filter includes a first substrate, a second substrate facing the first substrate, the second substrate being provided with a movable section and a holding section that holds the movable section in such a way that the movable section can move toward the first substrate, a first reflection coating provided on the first substrate, a second reflection coating provided on the movable section, the second reflection coating facing the first reflection coating with a gap left between the second reflection coating and the first reflection coating, and a gap variable section that can change the dimension of the gap based on an input value input from the control section, the detecting section includes a plurality of detecting elements arranged in a two-dimensional array in at least a region facing the first reflection coating and the second reflection coating, and the control section includes a drive control section that makes the gap variable section change the dimension of the gap by outputting the input value to the gap variable section, a storing section that stores correlation data in which the wavelengths of lights received by the detecting elements for the input value input to the gap variable section are recorded, an element identifying section that identifies the detecting element that can receive a light with a wavelength to be measured for the input value input to the gap variable section based on the correlation data, and a light amount obtaining section that obtains the amount of the light with the wavelength to be measured which was detected by the detecting element identified by the element identifying section.

Here, the input value differs depending on the configuration of the gap variable section. For example, as the gap variable section, when a configuration is adopted in which a first electrode is provided on the first substrate and a second electrode facing the first electrode is provided on the second substrate and the movable section is moved by electrostatic attraction, the input value is a voltage value which is applied to the first electrode and the second electrode. Moreover, for example, in a configuration in which a gap between the first reflection coating and the second reflection coating is a hermitically sealed space and the gap variable section changes the gap by applying air pressure to the hermitically sealed space, the input value is the air pressure applied to the gap which is the hermitically sealed space or a value for controlling a pump generating the air pressure.

In this aspect of the invention, the light measurement device makes the gap variable section of the tunable interference filter change the gap between the first reflection coating and the second reflection coating by making the drive control section input an input value to the gap variable section, and receives a light which has been subjected to multiple interference in the gap and passed through the gap by the detecting section in which a plurality of detecting elements are arranged. At this time, the element identifying section of the light measurement device identifies the detecting element that can receive a light with a wavelength to be measured for the input value input to the gap variable section based on the correlation data stored in the storing section. Then, the light amount obtaining section obtains the amount of the light detected by this detecting element.

As a result, even when the second reflection coating on the movable section bends when the movable section is moved by the gap variable section, it is possible to identify the detecting element facing a portion that transmits a light with a wavelength to be measured, the portion of the gap between the first reflection coating and the second reflection coating. Therefore, by obtaining the amount of the light detected by the identified detecting element, it is possible to measure the amount of the light with the wavelength to be measured accurately.

In the light measurement device according to the aspect of the invention, it is preferable that the correlation data be set for each of identical wavelength detecting element groups, each being formed of at least one or more detecting elements receiving lights in an identical wavelength region for the input value input to the gap variable section.

When the stress balance acting on the holding section holding the movable section is uniform in the tunable interference filter, for example, when the holding section is disposed so as to be symmetric with respect to the center of the movable section, the portions placed on each concentric circle of the movable section are identical in the amount of bending, and the gap intervals between the first reflection coating and the second reflection coating in these portions are identical to one another. Therefore, in this case, lights in an identical wavelength region are received by the detecting elements disposed so as to face gap regions corresponding to each concentric circle.

As a result, when the plurality of detecting elements forming the detecting section are grouped into detecting element groups each receiving an identical wavelength region, correlation data for each detecting element group makes it possible to obtain the wavelength of a received light in each detecting element, the light received when a predetermined input value is input to the gap variable section. With such correlation data, as compared to a case, for example, in which correlation data is set for each detecting element, it is possible to reduce the amount of data and thereby perform measurement of the amount of light swiftly.

In the light measurement device according to the aspect of the invention, the correlation data may be set for each detecting element.

In this aspect of the invention, the correlation data is set for each detecting element.

Here, as described earlier, when the stress balance acting on the holding section holding the movable section is uniform in the tunable interference filter, the gap intervals between the first reflection coating and the second reflection coating in the portions placed on each concentric circle with respect to the center of the movable section are identical to one another. However, for example, when a film, an electrode wire, or the like is formed on the holding section or when there is unevenness in etching, variations may occur in the gap intervals even in the portions located on each concentric circle with respect to the center of the movable section. On the other hand, in the aspect of the invention, since the correlation data is set for each detecting element, the element identifying section can more accurately identify the detecting element that can receive a light with a wavelength to be measured, and the light amount obtaining section can more accurately obtain the amount of the light with the wavelength to be measured.

In the light measurement device according to the aspect of the invention, it is preferable that the drive control section obtain input values for the light with the wavelength to be measured based on the correlation data and input the obtained input values to the gap variable section while sequentially switching one input value to another.

When the amount of light is measured, the drive control section may sequentially switch one input value input to the gap variable section to another in the entire area of a region in which the gap can fluctuate, for example. However, doing so requires many unnecessary measurement values to detect, for example, a particular wavelength to be measured or the amount of light in a particular measurement wavelength region, resulting in a reduction in measurement efficiency.

On the other hand, in the aspect of the invention, the drive control section obtains an input value necessary for transmitting a light with a wavelength to be measured based on the correlation data, and inputs the input values thus obtained to the gap variable section while sequentially switching one input value to another. For example, as the correlation data, when an input value necessary for receiving a light with a wavelength $\lambda 1$ to be measured by a detecting element a is S1, an input value necessary for receiving the light with the wavelength $\lambda 1$ to be measured by a detecting element b is S2, and an input value necessary for receiving the light with the wavelength $\lambda 1$ to be measured by a detecting element c is S3, the drive control section inputs the input values S1, S2, and S3 to the gap variable section while sequentially switching one input value to another.

In such a configuration, when a wavelength to be measured or a wavelength region to be measured, for example, is determined in advance, it is possible to obtain the amount of the light with the wavelength to be measured by minimum driving and thereby perform swift measurement of the amount of light.

It is preferable that the light measurement device according to the aspect of the invention include an intensity distribution measuring section that measures the intensity distribution of the light with the wavelength to be measured based on the amount of the light with the wavelength to be measured which was detected by each detecting element and obtained by the light amount obtaining section.

In this aspect of the invention, the intensity distribution measuring section measures the intensity distribution of the light with the wavelength to be measured, the light contained in the incident light, based on the light intensity of the wavelength to be measured which was detected by each detecting element and obtained by the light amount obtaining section.

That is, since the detecting elements are arranged in an array, it is possible to generate an image in which the positions of pixels correspond to the positions of these detecting elements. Therefore, by expressing the intensity of a light with a wavelength to be measured in each detecting element by using a color, the shade of color, a contour line, or the like, it is possible to obtain an accurate light intensity distribution easily.

Moreover, by creating the intensity distribution of each wavelength of an image which has entered the detecting section, it is possible to perform accurate color analysis of each pixel of the image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described based on the drawings.

1. Overall Configuration of Image Spectroscopic Measurement Device

Figure 1:
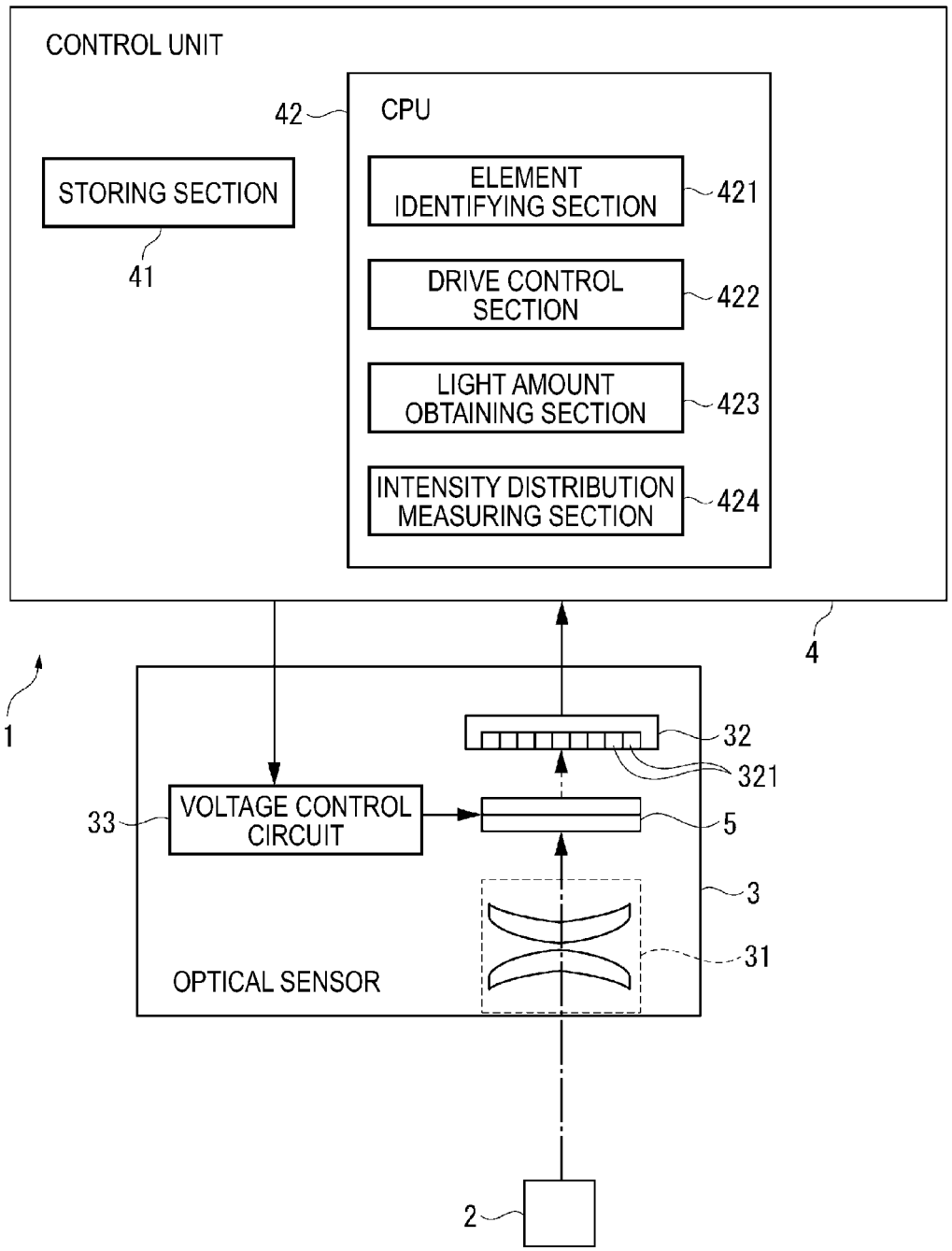
FIG. 1 is a diagram showing a schematic configuration of an image spectroscopic measurement device of a first embodiment according to the invention.

FIG. 1 is a diagram showing a schematic configuration of an image spectroscopic measurement device 1 (hereinafter referred to as a spectroscopic measurement device 1) of the embodiment according to the invention.

The spectroscopic measurement device 1 is a light measurement device according to the invention, and, as shown in FIG. 1, includes an optical sensor 3 and a control unit 4 forming a control section according to the invention. The spectroscopic measurement device 1 is a device that takes an image of an object 2 to be measured and measures the light amount distribution characteristics thereof.

2. Configuration of Optical Sensor

As shown in FIG. 1, the optical sensor 3 includes an incidence system 31, a tunable interference filter 5 according to the invention, a detecting section 32 receiving a light which has passed through the tunable interference filter 5, and a voltage control circuit 33 changing the wavelength of a light which is made to pass through the tunable interference filter 5.

2-1. Configuration of Incidence System

The incidence system 31 is an optical system guiding an incident light from the object 2 to be measured to the tunable interference filter 5, and is formed of a plurality of lenses and the like. Here, to make the tunable interference filter 5 disperse and transmit a light with a wavelength to be measured, it is necessary to make a light enter the tunable interference filter 5 perpendicularly. Therefore, in the incidence system 31 of this embodiment, a telecentric system is used, and a principal ray from an image of the object 2 to be measured enters a second substrate, which will be described later, of the tunable interference filter 5 so as to be perpendicular to the second substrate.

2-2. Configuration of Detecting Section

Figure 2:
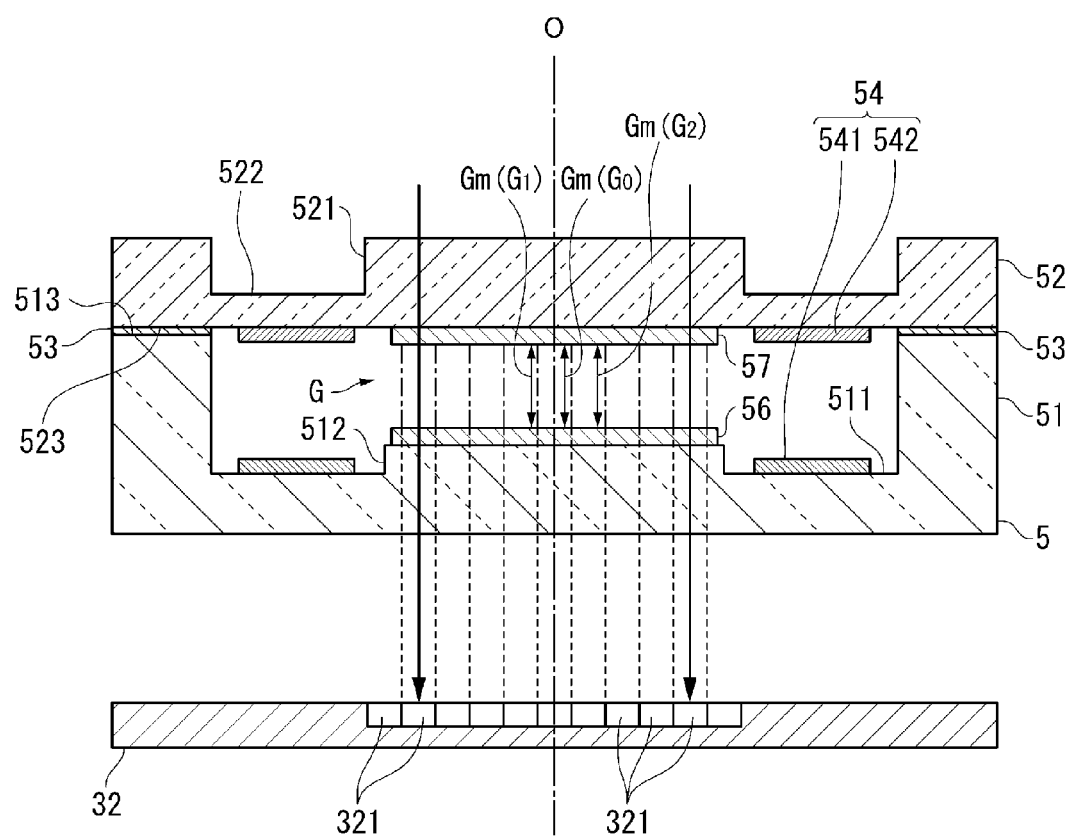
FIG. 2 is a sectional view showing a schematic configuration of a tunable interference filter and a detecting section of the first embodiment.

FIG. 2 is a sectional view showing a schematic configuration of the tunable interference filter 5 and the detecting section 32 of this embodiment.

As shown in FIG. 2, the detecting section 32 includes a plurality of detecting elements 321 arranged in an array. Here, these detecting elements 321 simply have to be arranged in such a way as to fill at least a region facing a first reflection coating 56 and a second reflection coating 57 of the tunable interference filter 5. The detecting elements 321 are formed of photoelectric conversion elements such as CCD (charge coupled device) elements, and generate an electrical signal according to the amount of the received light and output the signal to the control unit 4.

2-3. Configuration of Tunable Interference Filter

As shown in FIG. 2, the tunable interference filter 5 includes a first substrate 51 and a second substrate 52. The two substrates 51 and 52 are each formed of, for example, a material that can transmit a light in a visible light range, such as various kinds of glass including soda glass, crystalline glass, silica glass, lead glass, potassium glass, borosilicate glass, and no alkali glass and quartz. The two substrates 51 and 52 are formed integrally as a result of their bonded surfaces 513 and 523 formed along the outer edge being bonded together by a plasma-polymerized film 53 containing siloxane as a main ingredient, for example.

Moreover, between the first substrate 51 and the second substrate 52, the first reflection coating 56 and the second reflection coating 57 are provided. Here, the first reflection coating 56 is fixed on a surface of the first substrate 51, the surface facing the second substrate 52, and the second reflection coating 57 is fixed on a surface of the second substrate 52, the surface facing the first substrate 51. Furthermore, the first reflection coating 56 and the second reflection coating 57 are disposed so as to face each other with a gap G left between them.

In addition, between the first substrate 51 and the second substrate 52, an electrostatic actuator 54, which is a gap variable section according to the invention, for adjusting the dimension of the gap between the first reflection coating 56 and the second reflection coating 57 is provided. The electrostatic actuator 54 is formed of a first electrode 541 provided on the first substrate 51 and a second electrode 542 provided on the second substrate 52.

2-3-1. Configuration of First Substrate

The first substrate 51 has an electrode groove 511 and a mirror fixing section 512 which are formed on a surface facing the second substrate 52 by etching.

Though not shown in the drawing, the electrode groove 511 is formed into the shape of a ring whose center coincides with a planar central point in a plan view of a filter in which the first substrate 51 is seen from a substrate thickness direction.

The mirror fixing section 512 is formed into the shape of a cylinder jutting toward the second substrate 52 on the same axis as the electrode groove 511.

On the bottom face of the electrode groove 511, the ring-shaped first electrode 541 forming the electrostatic actuator 54 is formed. Moreover, the first electrode 541 has a first electrode wire (not shown) formed toward the periphery of the first substrate 51, the first electrode wire extending along a wiring groove. The tip of the first electrode wire is connected to the voltage control circuit 33.

Moreover, the first reflection coating 56 is fixed on a surface of the mirror fixing section 512, the surface facing the second substrate 52. The first reflection coating 56 may be a dielectric multilayer formed by stacking, for example, $SiO_2$ and $TiO_2$ or may be formed of a metal film such as an Ag alloy. Furthermore, the first reflection coating 56 may have a structure in which a dielectric multilayer and a metal film are stacked.

A first bonded surface 513 is formed outside the electrode groove 511 of the first substrate 51. As mentioned earlier, on the first bonded surface 513, the plasma-polymerized film 53 bonding the first substrate 51 and the second substrate 52 together is formed.

2-3-2. Configuration of Second Substrate

The second substrate 52 is formed as a result of a surface thereof which does not face the first substrate 51 being processed by etching. The second substrate 52 includes a cylindrical movable section 521 having a substrate central point as the center thereof and a holding section 522 having the same axis as the movable section 521 and holding the movable section 521. Here, the holding section 522 is formed so as to have the same peripheral radial dimension as the electrode groove 511 of the first substrate 51.

The movable section 521 is formed so as to be thicker than the holding section 522 to prevent bending.

The holding section 522 is a diaphragm surrounding the movable section 521, and is formed so as to have a thickness of 50 μm, for example. Incidentally, in this embodiment, the diaphragm-shaped holding section 522 is shown as an example; however, a structure may be adopted in which, for example, a holding section having a plurality of pairs of beam structures provided in positions which are symmetric with respect to a center of the movable section is provided.

On a surface of the holding section 522, the surface facing the first substrate 51, the ring-shaped second electrode 542 facing the first electrode 541 with a predetermined space left between them is formed. Here, as described earlier, the second electrode 542 and the first electrode 541 described above form the electrostatic actuator 54.

Moreover, from part of the outer edge of the second electrode 542, a second electrode wire (not shown) is formed toward the periphery of the second substrate 52, and the tip of the second electrode is connected to the voltage control circuit 33.

On a surface of the movable section 521, the surface facing the first substrate 51, the second reflection coating 57 facing the first reflection coating 56 with a gap left between them is formed. Incidentally, since the configuration of the second reflection coating 57 is the same as the first reflection coating 56, description thereof will be omitted.

2-3-3. Operation of Tunable Interference Filter at the Time of Application of Voltage FIG. 3 is a sectional view showing a state in which a voltage is applied between the first electrode 541 and the second electrode 542 in FIG. 2 and the movable section 521 is bent toward the first substrate 51.

Figure 3:
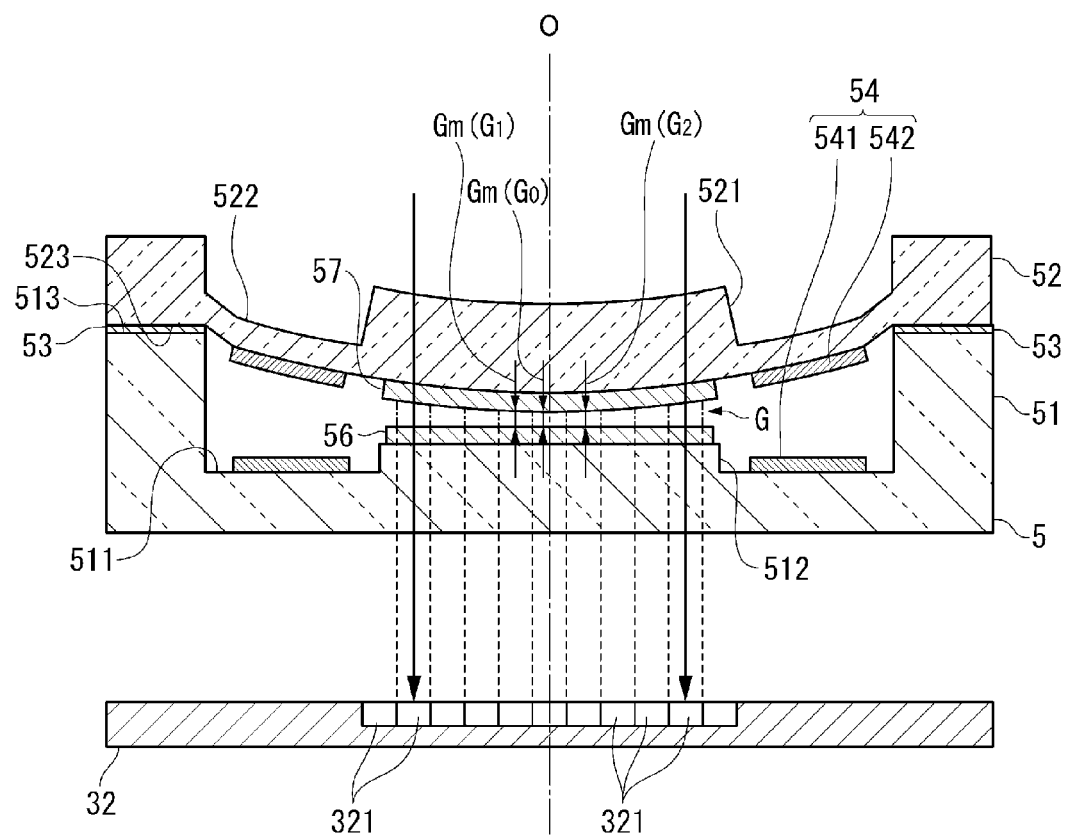
FIG. 3 is a sectional view showing a state in which a voltage is applied between a first electrode and a second electrode in FIG. 2 and a movable section is bent toward a first substrate.

In an initial state shown in FIG. 2, when a drive voltage is applied between the first electrode 541 and the second electrode 542 from the voltage control circuit 33, the movable section 521 of the second substrate 52 is displaced toward the first substrate 51 by electrostatic attraction as shown in FIG. 3.

Here, when a space between the first reflection coating 56 and the second reflection coating 57, the space forming the gap G, is divided into a plurality of partial gap regions Gm (m=0, 1, 2, . . . ) each facing a corresponding one of the detecting elements 321 of the detecting section 32, the amounts of gap change of the partial gap regions Gm at the time of application of a voltage have different values as shown in FIG. 3.

That is, when a drive voltage is applied to the electrostatic actuator 54, the holding section 522 is bent by electrostatic attraction, whereby the movable section 521 is displaced toward the first substrate 51. Here, although the movable section 521 is formed so as to be thicker than the holding section 522 to prevent bending, the movable section 521 actually bends slightly. As a result, as shown in FIG. 3, the dimension between the first reflection coating 56 and the second reflection coating 57 increases with distance from the central point of the movable section 521, and the partial gap regions have different gap interval values.

Here, since the movable section 521 and the holding section 522 are circular in a plan view and have the same axis, the holding section 522 is a diaphragm having a uniform thickness, and the second electrode 542 formed on the holding section 522 is also formed into the shape of a ring having a uniform thickness, the movable section 521 is bent around a central axis O. Therefore, the partial gap regions Gm (for example, partial gap regions $G_1$ and $G_2$ in FIGS. 2 and 3) which are away from the central axis by the same distance have the same gap interval. As a result, the wavelengths of lights which travel to the detecting section 32 through the partial gap regions Gm which are away from the central axis O by the same distance are within an identical wavelength region. Incidentally, in the following description, a group of the partial gap regions Gm which are away from the central axis O by the same distance is referred to as an identical gap region group, and, of the plurality of detecting elements 321 forming the detecting section 32, a group of detecting elements 321 facing the identical gap region group is referred to as an identical wavelength detecting element group.

2-4. Configuration of Voltage Control Circuit

Under control of the control unit 4, the voltage control circuit 33 controls the voltage which is applied to the first electrode 541 and the second electrode 542 of the electrostatic actuator 54.

3. Configuration of Control Unit

The control unit 4 controls the overall operation of the spectroscopic measurement device 1.

The control unit 4 is a computer formed of a storing section 41, a CPU (central processing unit) 42, and the like, and, for example, a general-purpose personal computer, a personal digital assistant, and, in addition to them, a computer for measurement can be used as the control unit 4.

The control unit 4 includes, as software to be executed on the CPU 42, an element identifying section 421, a drive control section 422, a light amount obtaining section 423, and an intensity distribution measuring section 424.

The storing section 41 stores various program products which are performed on the CPU 42 and various types of data. Moreover, the storing section 41 stores correlation data indicating the wavelength of a transmitted light detected by each detecting element 321 for a drive voltage which is applied to the electrostatic actuator 54.

Here, the correlation data stored in the storing section 41 will be described based on FIG. 4.

Figure 4:
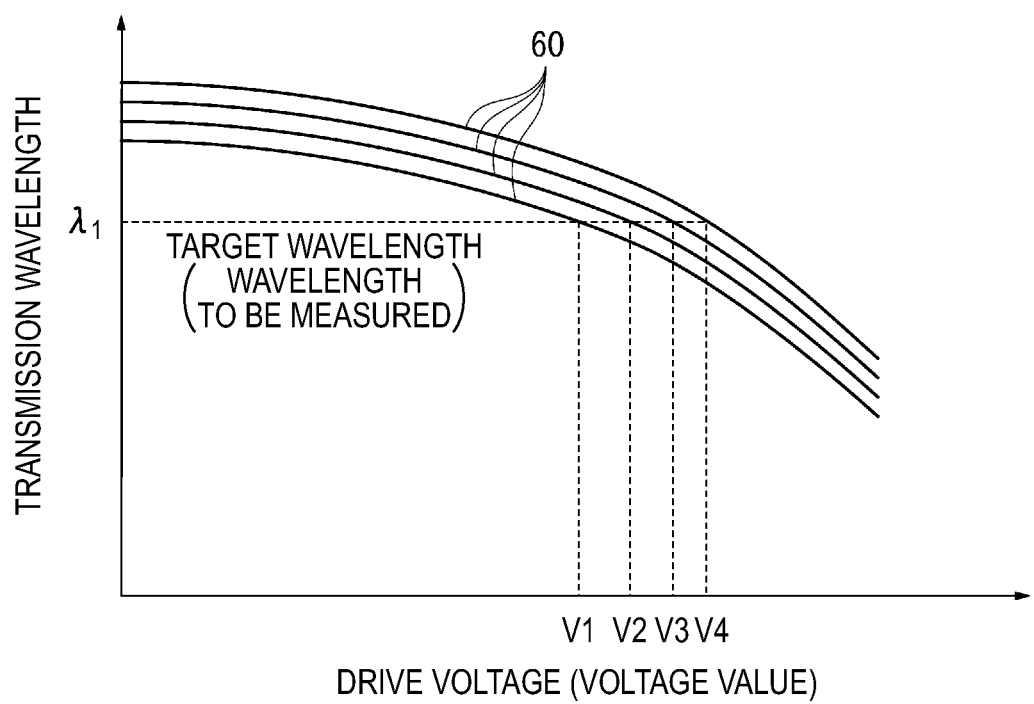
FIG. 4 is a diagram showing an example of correlation data of the first embodiment.

FIG. 4 is a diagram showing an example of the correlation data of this embodiment.

Correlation data 60 is data in which the wavelength (the wavelength of lights which pass through an identical gap region group) of lights which are received by an identical wavelength detecting element group for a voltage value (an input value according to the invention) of a drive voltage which is applied to the electrostatic actuator 54 is stored. As shown in FIG. 4, the correlation data is set for each identical wavelength detecting element group (each identical gap region group). Here, in FIG. 4, the correlation data 60 is depicted as a graph; however, in actuality, a look-up table in which data relating a voltage value and a transmission wavelength to each identical wavelength detecting element group is recorded is stored. Incidentally, what is stored in the storing section 41 is not limited to such a look-up table; for example, the relationship between a voltage value and a transmission wavelength for each identical wavelength detecting element group may be stored as mathematical data.

Next, the element identifying section 421, the drive control section 422, the light amount obtaining section 423, and the intensity distribution measuring section 424 which are software to be executed on the CPU 42 will be described.

Based on the correlation data 60 stored in the storing section 41, the element identifying section 421 obtains an identical wavelength detecting element group that can receive a light (a light to be measured) with a wavelength (a wavelength to be measured) which is an object to be measured for a voltage value (an input value) of a drive voltage set by the drive control section 422.

Based on the correlation data 60 stored in the storing section 41, the drive control section 422 obtains a voltage value at which the light to be measured can be received in each detecting element 321 of the detecting section 32. For example, in an example shown in FIG. 4, when the wavelength to be measured is λ1, the drive control section 422 obtains voltage values V1, V2, V3, and V4. Then, the drive control section 422 displaces the interval of the gap G of the tunable interference filter 5 by outputting the obtained voltage values V1, V2, V3, and V4 to the voltage control circuit 33 in order of increasing voltage value, for example, while switching one voltage value to another.

The light amount obtaining section 423 obtains the amount of the light to be measured, the light received by each detecting element 321 of the identical wavelength detecting element group obtained by the element identifying section 421 for the voltage value output from the drive control section 422.

Figure 5A:
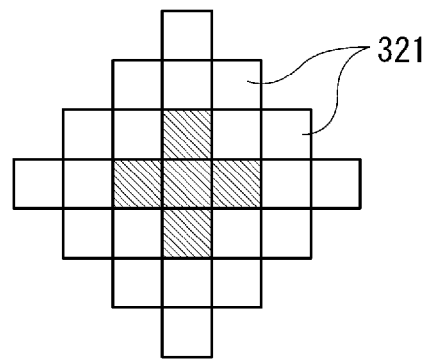
FIGS. 5A to 5D are diagrams showing an identical wavelength detecting element group that can receive a light to be measured for a predetermined voltage value in the first embodiment.
Figure 5B:
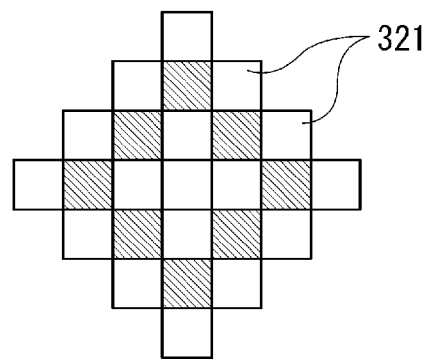
Figure 5C:
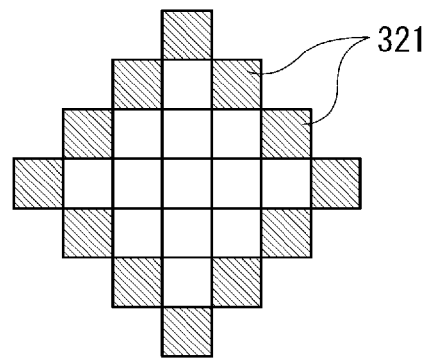
Figure 5D:
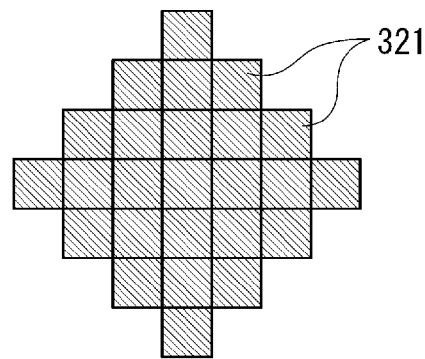

FIGS. 5A to 5D are diagrams showing an identical wavelength detecting element group that can receive a light to be measured for a predetermined voltage value. In FIGS. 5A to 5D, FIG. 5A shows the position of an identical wavelength detecting element group that can detect the wavelength λ1 to be measured corresponding to the voltage value V1 in FIG. 4, FIG. 5B shows the position of an identical wavelength detecting element group that can detect the wavelength λ1 to be measured corresponding to the voltage value V2 in FIG. 4, and FIG. 5C shows the position of an identical wavelength detecting element group that can detect the wavelength λ1 to be measured corresponding to the voltage value V3 in FIG. 4. Moreover, FIG. 5D is a diagram showing the result obtained by combining the light amount detection results in the identical wavelength detecting element groups shown in FIGS. 5A to 5C. Incidentally, the position of an identical wavelength detecting element group that can detect the wavelength λ1 to be measured corresponding to the voltage value V4 is not shown in FIGS. 5A to 5D.

The light amount obtaining section 423 obtains the amount of light of the detecting element 321 that can receive the light to be measured for each of the voltage values set and sequentially switched by the drive control section 422 as shown in FIGS. 5A to 5D.

Figure 6A:
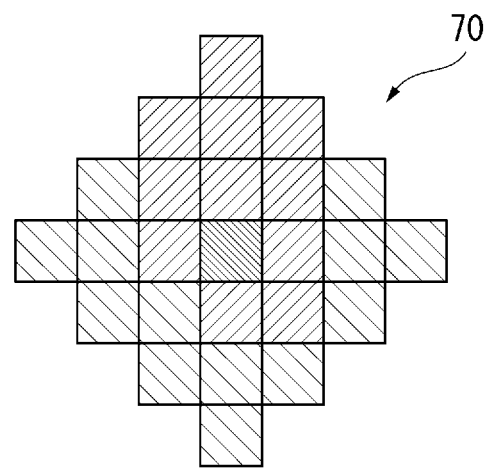
FIGS. 6A and 6B are diagrams showing an example of a light intensity distribution map.
Figure 6B:
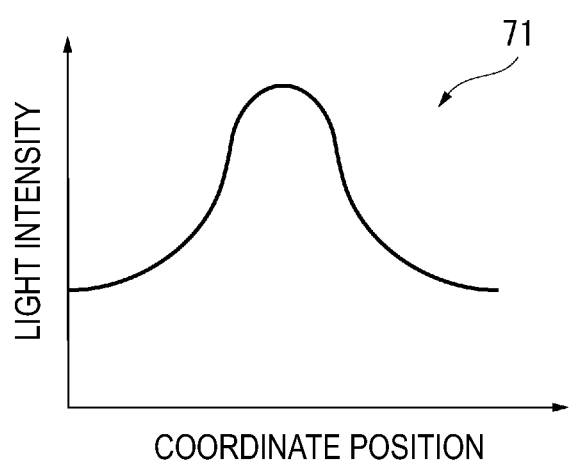

FIGS. 6A and 6B are diagrams showing an example of a light intensity distribution map.

The intensity distribution measuring section 424 creates a light intensity distribution map shown in FIGS. 6A and 6B based on the amount of the light to be measured which was detected by each detecting element 321 and obtained by the light amount obtaining section 423.

4. Operation of Spectroscopic Measurement Device

Figure 7:
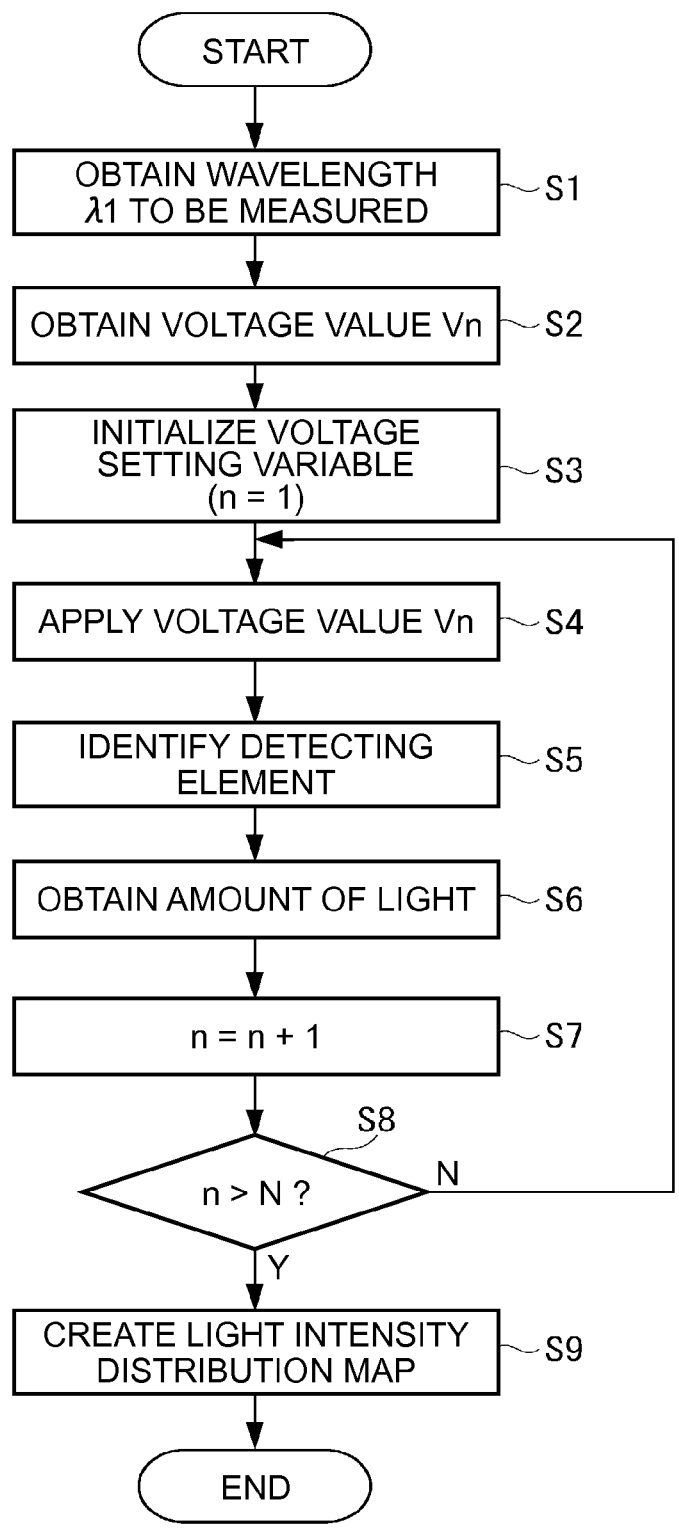
FIG. 7 is a flowchart of a spectroscopic measurement device 1 of the first embodiment.

Next, based on a flowchart of the spectroscopic measurement device 1 of this embodiment shown in FIG. 7, operation of the spectroscopic measurement device 1, the operation for measurement of the light to be measured, will be described.

In the spectroscopic measurement device 1, a wavelength to be measured, the wavelength of a light to be measured, is first obtained to measure an in-plane light distribution of the light to be measured (step S1). The wavelength to be measured may be obtained by being input by means of an input unit such as a keyboard connected to the control unit 4 of the spectroscopic measurement device 1, for example, or previously-set wavelengths to be measured may be obtained sequentially.

Then, the drive control section 422 of the control unit 4 obtains, from the storing section 41, a voltage value Vn at which each wavelength detecting element group can receive the wavelength to be measured by setting the wavelength λ1 to be measured as a target wavelength (step S2). Moreover, at this time, the drive control section 422 also obtains the number of obtained voltage values (a voltage setting maximum number N).

Then, the control unit 4 initializes a voltage setting variable n and sets n=1 (step S3).

The drive control section 422 then inputs the voltage value Vn to the voltage control circuit 33 as an input value (step S4). As a result, the voltage value Vn is applied to the electrostatic actuator 54 of the tunable interference filter 5, and the movable section 521 is displaced toward the first substrate 51 by an amount according to the voltage.

When the tunable interference filter 5 is driven and a transmitted light is received by the detecting section 32, the control unit 4 identifies the detecting element 321 that can receive the light to be measured for the voltage value Vn (step S5).

Specifically, the element identifying section 421 searches the correlation data 60 stored in the storing section 41 for an identical wavelength detecting element group that can receive a light with the wavelength λ1 to be measured for the voltage value Vn output from the drive control section 422 to the voltage control circuit 33 in step S4, and identifies each detecting element 321 included in the identical wavelength detecting element group.

Then, the light amount obtaining section 423 obtains the amount of the light to be measured which was detected by each detecting element 321 identified in step S5 (step S6). Moreover, the light amount obtaining section 423 stores the obtained amount of light in the storing section 41.

Next, the control unit 4 adds 1 to the voltage setting variable n (step S7), and determines whether or not the voltage setting variable n becomes greater than the voltage setting maximum number N (step S8).

Here, if n≤N, the control unit 4 goes back to step S4, that is, repeats the processes from steps S4 to S8.

Moreover, if the voltage setting variable n is greater than N in step S8, the intensity distribution measuring section 424 creates a light intensity distribution map 70 shown in FIG. 6A based on the detection result of the amount of the light to be measured which was obtained by the detecting elements 321 and stored in the storing section 41 (step S9).

In step S9, the intensity distribution measuring section 424 creates the light intensity distribution map 70 having pixels corresponding to the positions of coordinates of the detecting elements 321 arranged in an array. At this time, the intensity distribution measuring section 424 determines the shade of color of each pixel according to the amount of the light to be measured which was received by the detecting element 321 corresponding to each pixel. Here, the light intensity distribution map 70 in which, as a color of each pixel of the intensity distribution measuring section 424, a color corresponding to the wavelength λ1 to be measured is used for the light to be measured, for example, may be created, or the light intensity distribution map 70 in which the light intensity is expressed by a gray scale, for example, may be created. In addition, the distribution of the amount of light may be expressed by changing the color or using a contour line according to the amount of light. Moreover, as shown in FIG. 6B, a light intensity distribution curve 71 indicating the distribution of light intensity along a direction of a straight line may be created.

Incidentally, in the above description, an example in which the light intensity distribution of one wavelength λ1 to be measured is measured and the light intensity distribution map 70 or the light intensity distribution curve 71 of the light intensity distribution thus measured is created has been shown. When the light intensities for a plurality of wavelengths λn are measured, such measurement can be performed by repeating the processes in steps S2 to S9 by switching one value of the wavelength λ to be measured to another in step S1. For example, when the chromaticity distribution in an image to be measured is measured, steps S2 to S9 described above are performed by continuously switching one wavelength λ to be measured to another, whereby it is possible to measure the distribution of the light intensity of each wavelength in a visible light range and, by combining them, it is possible to measure the chromaticity distribution in an image obtained (taken) by the detecting section 32.

5. Effects of First Embodiment

As described above, in the spectroscopic measurement device 1 of the first embodiment described above, the element identifying section 421 identifies the detecting element 321 that can receive a light to be measured for a voltage value applied to the electrostatic actuator 54 of the tunable interference filter 5 based on the correlation data 60, and the light amount obtaining section 423 receives the amount of the light detected by the identified detecting element 321. As a result, even when the movable section 521 bends due to the driving of the electrostatic actuator 54 and different partial gap regions Gm have different dimensions, it is possible to identify the detecting element 321 that can receive the light to be measured. Since the amount of light is obtained based on the identified detecting element 321, it is possible to improve the light amount detection accuracy.

Moreover, the correlation data 60 is set for each identical wavelength detecting element group.

That is, in the tunable interference filter 5 of this embodiment, the movable section 521 is formed into the shape of a cylinder, and the periphery thereof is held by the holding section 522 which is a ring-shaped diaphragm. In such a configuration, if the balance of stress on the diaphragm is uniform, when the movable section 521 is driven by the electrostatic actuator 54, the partial gap regions Gm which are away from the central axis O by the same distance have the same dimension, and lights in an identical wavelength region pass through the partial gap regions Gm. In such a case, when the correlation data 60 is set for each identical wavelength detecting element group, there is no need to set the correlation data 60 for each detecting element 321, for example. This makes it possible to reduce the data amount of correlation data 60 stored in the storing section 41. Moreover, it is possible to perform processing swiftly in such processing as identification of the detecting element 321 by the element identifying section 421 or setting of a voltage value by the drive control section 422 and thereby perform light amount distribution measurement swiftly as a whole.

Furthermore, based on the correlation data 60, the drive control section 422 obtains a voltage value required to receive a wavelength to be measured in each identical wavelength detecting element group, and outputs the voltage values thus obtained to the voltage control circuit 33 while sequentially switching one voltage value to another.

In such a configuration, as compared to when, for example, the amount of light is obtained by continuously changing the voltage from a minimum voltage to a maximum voltage that can be set in the electrostatic actuator 54 of the tunable interference filter 5, it is possible to obtain the amount of light for a wavelength to be measured swiftly.

Then, the intensity distribution measuring section 424 creates the light intensity distribution map shown in FIGS. 6A and 6B based on the obtained amount of the light to be measured of each detecting element 321. Creating such a light intensity distribution map allows the user to grasp easily the distribution of the in-plane light intensity of the light to be measured. Moreover, by creating the light intensity distribution map for each wavelength in a visible light range, for example, it is possible to measure the chromaticity distribution of an image to be measured and thereby perform color analysis of the image to be measured accurately.

Second Embodiment

Next, a second embodiment of the invention will be described based on the drawing.

Figure 8:
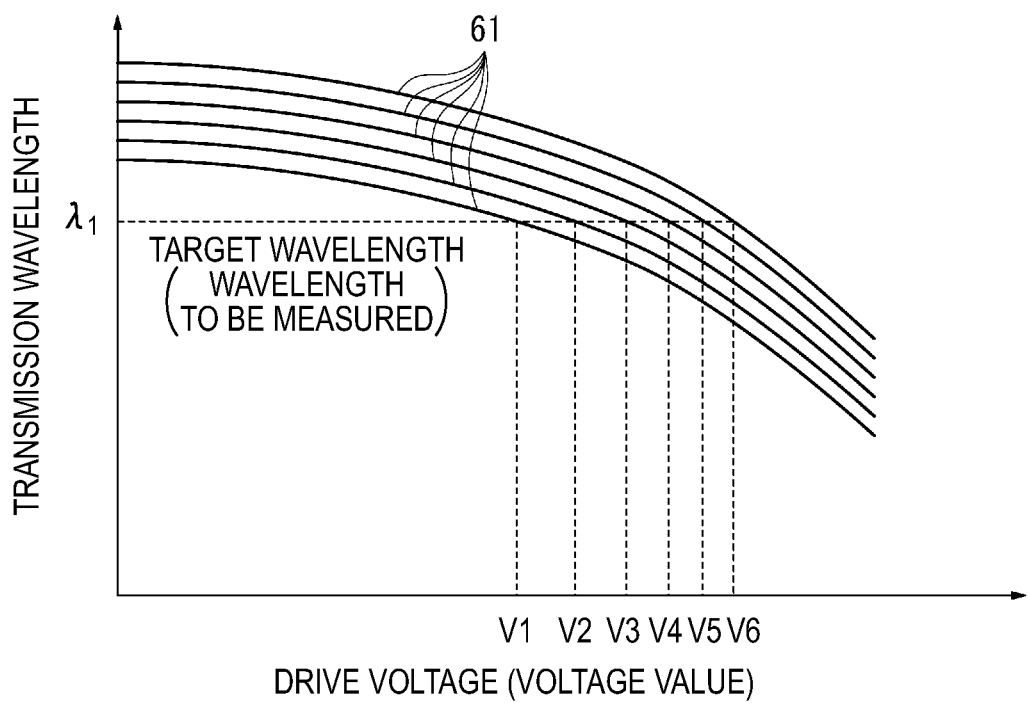
FIG. 8 is a diagram showing an example of correlation data in a second embodiment.

FIG. 8 is a diagram showing an example of correlation data in the second embodiment. Incidentally, in the following description of the second embodiment, the same components as those of the first embodiment described above are identified with the same reference numerals and their descriptions will be omitted.

In the first embodiment described above, a configuration in which the correlation data 60 is set for each identical wavelength detecting element group has been described. On the other hand, in the second embodiment, as shown in FIG. 8, correlation data 61 is set for each detecting element 321.

Also with such a spectroscopic measurement device, it is possible to perform measurement of light amount distribution by the same processing as that performed in the first embodiment described above in measuring the light amount distribution of a light to be measured.

In the spectroscopic measurement device having such correlation data 61, although the amount of data is increased as compared to the correlation data 60 of the first embodiment, it is possible to perform spectroscopic measurement with a higher degree of accuracy.

That is, in the tunable interference filter 5, due to membrane stress of the second reflection coating 57 provided on the movable section 521, membrane stress of the second electrode 542, a position in which the second electrode wire is placed, misalignment caused at the time of production, or the like, the balance of distortion which occurs when the movable section 521 is displaced is sometimes not symmetric with respect to the central axis O. In such a case, even in a group of the partial gap regions Gm which are away from the central axis O by the same distance, the amounts of gap displacement when the movable section 521 is displaced are different from one another. Moreover, even when the partial gap region Ga and the partial gap region Gb have the same dimension at the time of application of, for example, a voltage Vα, the partial gap region Ga and the partial gap region Gb may have different dimensions when another voltage Vβ is applied.

In such a case, in the second embodiment, since the correlation data 61 is set for each detecting element 321, it is possible to identify accurately the detecting element 321 that can receive a light to be measured when a predetermined voltage value Vn is applied to the electrostatic actuator 54. Thus, the intensity distribution measuring section 424 can create a more accurate light intensity distribution map 70 based on the amount of light detected by the detecting element 321 thus identified, whereby it is possible to improve the measurement accuracy.

Other Embodiments

It is to be understood that the invention is not limited in any way by the embodiments thereof described above, and, unless modifications and variations depart from the scope of the invention, they should be construed as being included therein.

For example, in the first embodiment, an example in which the drive control section 422 obtains, based on the correlation data 60, a voltage value required to receive a wavelength to be measured in the detecting section 32 and inputs the voltage values thus obtained to the voltage control circuit while sequentially switching one voltage value to another has been shown. On the other hand, when the light intensity distribution of each wavelength in a particular wavelength region such as a certain visible light range, for example, is measured, the drive control section 422 may continuously switch one voltage value which is applied to the electrostatic actuator 54 to another from a settable minimum voltage to a settable maximum voltage, for example. In this case, the amount of light detected by each detecting element 321 when the voltage value is set at each voltage value is stored in the storing section 41. Then, the light amount obtaining section 423 may obtain the amount of light for a light to be measured by obtaining the amount of light of the detecting element 321 identified by the element identifying section 421 based on the light amount detection result stored in the storing section 41.

Moreover, in the embodiments described above, the electrostatic actuator 54 that displaces the movable section 521 by bending the holding section 522 as a result of a voltage being applied between the first electrode 541 and the second electrode 542 is taken up as an example of a gap variable section; however, the gap variable section is not limited thereto.

For example, a configuration using a dielectric actuator in which a first dielectric coil is disposed in place of the first electrode 541 and a second dielectric coil or a permanent magnet is disposed in place of the second electrode may be adopted. For example, in the configuration in which the first dielectric coil and the permanent magnet are provided, a magnetic force is generated by a current which is passed through the first dielectric coil, and the movable section 521 is displaced by an attractive force or a repulsive force generated between the first dielectric coil and the permanent magnet. In such a configuration, as the correlation data 60 and 61, data that records a transmission wavelength that can be received by each detecting element 321 or each identical wavelength detecting element group for a current value by using a current value which is passed through the first dielectric coil as an input value may be used.

Furthermore, a configuration in which a piezoelectric actuator is used in place of the electrostatic actuator 54 may be adopted. In this case, a lower electrode layer, a piezoelectric membrane, and an upper electrode layer are stacked on the holding section 522, for example, and the holding section 522 is bent by making the piezoelectric membrane expand and contract by changing a voltage which is applied between the lower electrode layer and the upper electrode layer. In such a configuration, as the correlation data 60 and 61, data that records a transmission wavelength that can be received by each detecting element 321 or each identical wavelength detecting element group for a voltage value by using a voltage value that is applied between the lower electrode layer and the upper electrode layer as an input value may be used.

In addition, a configuration in which an actuator using air pressure is used in place of the electrostatic actuator 54 may be adopted. In this case, a space between the first substrate 51 and the second substrate 52 is hermetically sealed, and an air introduction hole introducing air into the hermetically sealed space is provided. Then, the movable section 521 is displaced by a change in the internal pressure by providing, in the air introduction hole, a pump that changes the internal air pressure and changing the air pressure. In such a configuration, as the correlation data 60 and 61, data which uses the air which is introduced into the hermetically sealed space or let out of the hermetically sealed space as an input value may be used, and, when a motor pump is connected, data which uses electric power for driving the motor pump as an input value may be used.

In the embodiments described above, the holding section 522 in the form of a diaphragm has been taken up as an example; however, for example, as described earlier, a configuration may be adopted in which a plurality of beam-shaped holding sections are provided and the movable section 521 is held by these beam-shaped holding sections. In this case, it is preferable to provide the holding sections which are symmetric with respect to the central axis O to make the bending balance of the beam-shaped holding sections uniform.

Moreover, in the embodiments described above, an example in which various kinds of lenses forming a telecentric system are used as the incidence system 31 to take an image of the object 2 to be measured with the detecting section 32 has been shown; however, for example, a configuration may be adopted in which an incidence system that converts the light from the object 2 to be measured into a parallel light and makes the parallel light enter the tunable interference filter 5 is incorporated.

In addition to the modifications and variations described above, the specific structure and procedure at the time of implementation of the invention can be appropriately changed to another structure etc. unless it departs from the scope of the invention.

What is claimed is:

1. A measurement method for a light measurement device, the measurement method comprising:
    controlling a tunable interference filter based on a drive input, such that the tunable interference filter transmits a selected wavelength of a light;
    detecting light passed through the tunable interference filter via a plurality of detecting elements arranged in a two-dimensional array;
    identifying a subject detecting element from among the plurality of detecting elements based on a correlation data stored in a storing section, wherein the subject detecting element receives the light having the selected wavelength transmitted by the tunable interference filter, and the correlation data indicates a wavelength detected by each of the detecting elements for the drive input; and
    determining an amount of the light detected by the subject detecting element.

2. The measurement method of claim 1 wherein the tunable interference filter includes a first reflection coating, a second reflection coating, and a gap variable section that changes a gap between the first reflection coating and the second reflection coating in response to the drive input.

3. The measurement method of claim 1 further comprising:
    controlling the tunable interference filter based on a first input value as the drive input;
    identifying a first detecting element as the subject detecting element based on the correlation data;
    determining a first amount of light detected by the first detecting element;
    controlling the tunable interference filter based on a second input value as the drive input, wherein the second input value is different from the first input value;
    identifying a second detecting element as the subject detecting element based on the correlation data;
    determining a second amount of light detected by the second detecting element; and
    generating a light intensity distribution based on the first amount of light and the second amount of light detected by the first detecting element and the second detecting element, respectively, wherein the correlation data associates the first input value with a wavelength to be measured by the first detecting element and the second input value with a wavelength to be measured by the second detecting element.

4. The measurement method of claim 1 further comprising:

controlling the tunable interference filter based on a first input value as the drive input;

identifying a plurality of first detecting elements as the subject detecting element based on the correlation data, wherein the plurality of detecting elements includes the plurality of first detecting elements;

determining a first amount of light received by each of the plurality of first detecting elements;

controlling the tunable interference filter based on a second input value as the drive input, wherein the second input value is different from the first input value;

identifying a plurality of second detecting elements as the subject detecting element based on the correlation data, wherein the plurality of detecting elements includes the plurality of second detecting elements which are different from the plurality of first detecting elements;

determining a second amount of light received by each of the plurality of second detecting elements; and generating a light intensity distribution based on the first amount of light detected by each of the plurality of first detecting elements and on the second amount of light detected by each of the plurality of second detecting elements, wherein the correlation data associates the first input value with a wavelength to be measured by the plurality of first detecting elements and the second input value with a wavelength to be measured by the plurality of second detecting elements.

5. The measurement method of claim 1 wherein the tunable interference filter includes reflection films disposed opposite to each other.

6. A measurement method for a light measurement device, the light measurement device including a tunable interference filter and a plurality of detecting elements, the tunable interference filter including a first substrate, a second substrate facing the first substrate, the second substrate being provided with a movable section and a holding section that holds the movable section in such a way that the movable section moves toward the first substrate, the measurement method comprising:

changing a dimension of a gap between the first substrate and the second substrate of the tunable interference filter based on a drive input such that the tunable interference filter transmits a selected wavelength of light;

detecting the light transmitted by the tunable interference filter via the plurality of detecting elements, wherein the plurality of detecting elements are arranged in a two-dimensional array;

identifying a subject detecting element from among the plurality of detecting elements based on a correlation data stored in a storing section, wherein the subject detecting element receives the light having the selected wavelength transmitted by the tunable interference filter, and the correlation data indicates a wavelength detected by each of the detecting elements for the drive input; and determining an amount of the light detected by the subject detecting element.

7. A measurement method for a light measurement device, the light measurement device including a tunable interference filter and a plurality of detecting elements, the tunable interference filter including a first substrate, a second substrate facing the first substrate, and a gap variable section, the second substrate being provided with a movable section and a holding section that holds the movable section in such a way that the movable section moves toward the first substrate, the first substrate including a first reflection coating and the moveable section of the second substrate including a second reflection coating, the second reflection coating facing the first reflection coating with a gap left between the second reflection coating and the first reflection coating, the measurement method comprising:

outputting a drive input to the gap variable section of the tunable interference filter, wherein the gap variable section changes a dimension of the gap between the first reflection coating and the second reflection coating in response to the drive input such that the tunable interference filter transmits a selected wavelength of light;

detecting a light transmitted by the tunable interference filter via the plurality of detecting elements, wherein the plurality of detecting elements are arranged in a two-dimensional array in at least a region facing the first reflection coating and the second reflection coating of the tunable interference filter;

identifying a subject detecting element from among the plurality of detecting elements based on a correlation data stored in a storing section, wherein the subject detecting element receives the light transmitted by the tunable interference filter, and the correlation data indicates a wavelength detected by each of the detecting elements for the drive input; and determining an amount of the light detected by the subject detecting element.

\* \* \* \* \*